United States Patent [19]
Boshier

[11] Patent Number: 4,837,615
[45] Date of Patent: Jun. 6, 1989

[54] GAP MEASURING APPARATUS

[75] Inventor: Geoffrey Boshier, Greenbrier, Tenn.

[73] Assignee: Textron Inc., Providence, R.I.

[21] Appl. No.: 101,985

[22] Filed: Sep. 29, 1987

[51] Int. Cl.$^4$ .............................................. H04N 7/18
[52] U.S. Cl. ..................... 358/100; 358/107; 358/229; 356/375
[58] Field of Search ................ 358/100, 107, 98, 101, 358/93, 229; 356/378; 364/562, 563

[56] References Cited

U.S. PATENT DOCUMENTS

| | | | |
|---|---|---|---|
| 4,411,528 | 10/1983 | Newcomb et al. | 356/325 |
| 4,549,207 | 10/1985 | Boshier | 358/100 X |
| 4,600,938 | 7/1986 | Slugter et al. | 358/98 |
| 4,653,106 | 3/1987 | Yamatsata et al. | 356/378 X |
| 4,725,883 | 2/1988 | Clark, Jr. et al. | 358/100 |

Primary Examiner—James J. Groody
Assistant Examiner—Victor R. Kostak
Attorney, Agent, or Firm—Irwin P. Garfinkle

[57] ABSTRACT

The invention disclosed herein comprises a hand held optical probe axially insertable into the fastener holes of a multilayered panel for measuring the gap between the edges of the panels at the hole site. The hand held probe includes a light source, two bundles of optical fibers for directing light axially into a fastener hole, the tip end of the bundles being directed at a right angle to the axis of the fastener hole so that the panel edges are illuminated. When the probe is at gap depth the light energy reflected from the panel edges is directed by a right angle prism through a lens system in the probe to a video scanning camera which provides an electronic video image of the gap size. A spring biased conical guide mounted on the housing of the probe, and through which the tip end of the probe projects serves to center the tip end of the probe in the fasterner hole.

2 Claims, 1 Drawing Sheet

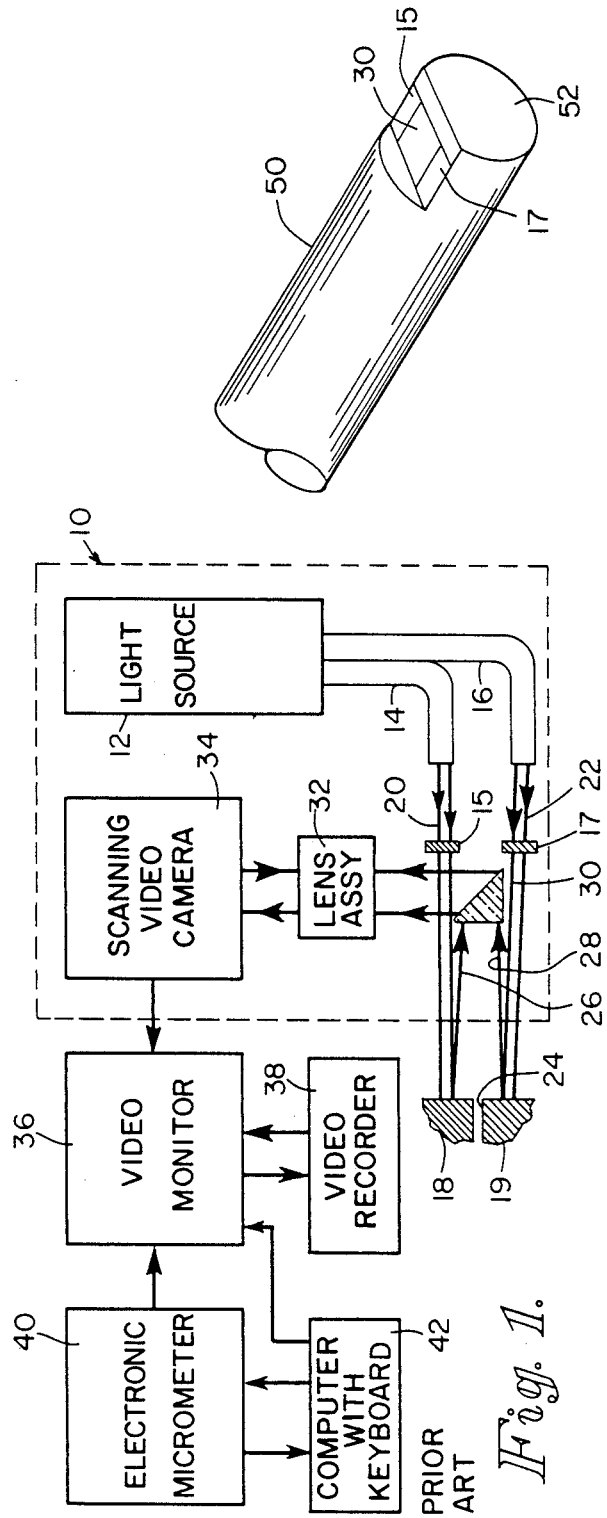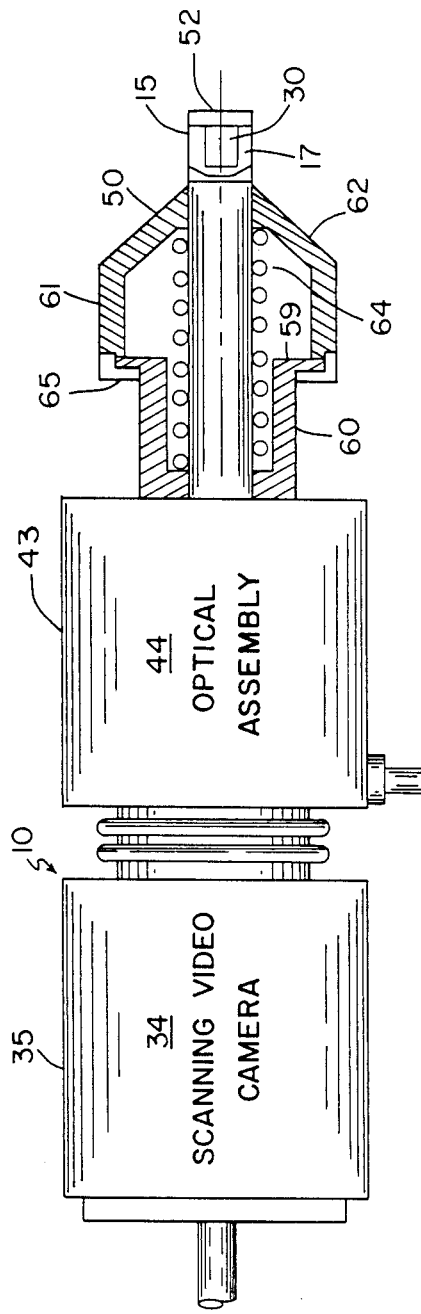

4,837,615

GAP MEASURING APPARATUS

BACKGROUND OF THE INVENTION

This invention is an improvement over the gap measuring device disclosed and claimed in my U.S. Pat. No. 4,549,207 issued on Oct. 22, 1985. As disclosed in my prior patent, highly stressed aerospace vehicle structures such as the wings of high speed aircraft, require enhanced life expectancy against fatigue. In the manufacture of such structures, several layers of panels are fastened together by means of fasteners inserted through holes drilled in the panels. The space (or gap) between multilayered panels at the location of each fastener must be reduced to acceptable values before the fastener is tightened, since out of tolerance gaps will create localized stress regions when the panels are drawn together by torquing down the threaded fastener bolts. To prevent the occurrence of these stresses, the gaps between the marting panels are measured, and if necessary, shims are inserted to eliminate, or at least reduce the gap to an acceptable level. The gaging of the gaps for the preparation of the shims is made through the fastener holes. It it the object of the present invention to accomplish the same results disclosed in my prior patent, but with improved accuracy and efficiency.

My prior patented system utilized a rigid borescope having fiber optic illumination of the panel edges surrounding the fastener hole. A right angle prism at the tip, or probe end of the borescope permitted the viewing of the panel edges and the sensing of the gap between the panels. Precision eccentric sleeves were required as guides to provide centering of the borescope probe end within the fastener holes, different size eccentrics being required for different sizes and shapes of holes. In accordance with this invention, I provide a spring biased, conically tapered probe guide which serves automatically to guide the probe end of the borescope into the center of the hole, and can function for a wide variety of fastener holes with ease of use and precision results.

SUMMARY OF THE INVENTION

The invention disclosed herein comprises a hand held optical probe axially insertable into the fasteners holes of a multilayered panel structure for measuring the gap between the panels. The hand held probe is assembled in two small housings, one containing an optical assembly and the other a video camera. The optical assembly includes a light source, two bundles of optical fibers for directing the light from the source axially into the fastener hole, the end of the fiber optic bundles extending at a right angle to the axis of the fastener holes so that the panel edges surrounding the holes are illuminated when the probe is at the gap depth. The light energy reflected from the edges is then directed by a right angle prism and a lens system on to the receptor surface of a video camera which views the spacing between the panels. The probe is centered by means of a spring biased slideable conical guide through which the probe projects.

IN THE DRAWINGS

FIG. 1 is a schematic diagram of the gap measuring system, and is functionally identical to FIG. 1 in my U.S. Pat. No. 4,549,207;

FIG. 2 is a view, partially cut away of the improved gap measuring system; and

FIG. 3 is a three dimensional view of the borescope probe.

DESCRIPTION OF THE INVENTION

The object of my prior system, and of the present invention is to obtain very precise data concerning the gap (or gaps) 24 between multilayered structural panels, as viewed by a borescope 50 inserted into the fastener holes drilled through the layers. Only two panels 18 and 19 together with the air gap 24 are shown in FIG. 1 of the drawings; however, it will be understood that the gaps between three or more panel layers may also be measured precisely by means of this invention.

As seen in FIG. 1, which is more fully described in my prior patent, a video imaging unit 10, which includes light source 12, projects white light down fiber optic bundles 14 and 16. The light beams 20 and 22 exit from the bundles 14 and 16 at right angles to the axis of the fastener holes and pass through spaced window 15 and 17 in the end of the borescope 50 to illuminate the edges of the panels 18 and 19, and the gap 24 between the panels.

The reflected beams 26 and 28 are bent at right angles by means of a prism 30 and passed through a lens assembly 32 to a video scanning camera 34, where it is processed to provide a replica of the data pertaining to the gap 24.

The processed video signal from the camera 34 is then passed to a video monitor 36 where the actual gap, usually enlarged, may be viewed. The video signal may also be recorded on a video recorder 38.

To enable the technician to determine with precision the size of the gap displayed on the video monitor, an electronic micrometer provides a pair of cursors for display on the monitor. In practice, the technician moves the cursors to superimpose them over the image on the monitor screen, one superimposed on the edge of one panel, and one superimposed on the other. Movement of the cursors activates two linear potentiometers within the electronic micrometer 40 to provide a digital read out which represents the gap size which may then be compared with reference data fed in from a computer 42.

As seen in FIG. 2, the video imaging unit 10 is assembled in two units. The scanning video camera 34 is contained in a rigid housing 35, and the optical assembly 44, which includes the remainder of the elements of unit 10, is contained in a rigid housing 43. The units 35 and 43 are mechanically coupled together by means of threaded rings 46, and in the embodiment of my invention as reduced to practice this assembly provided a convenient handle for the probe.

The light source in the optical assembly is powered through a cable 45, while a cable 48 provided the intercommunications between the camera and the monitor 36.

The cylindrical barrel of borescope 50, which is the same device that I disclosed in my prior patent is supported within the housing 43 and projects through it. Surrounding the borescope 50 where it projects from the housing 43 is a fixedly mounted cylindrical support member 60, which is provided with a cylindrical flange 59. A second cylinder 61, having a truncated conical end 62 is slidably mounted on the cylinder barrel of borescope 50 and the flange 59 of the cylinder 60. The tip 52 of the borescope 50 projects through the truncated conical end 62 of the cylinder 61. A coiled spring 54 positioned within the cylinder 61 and surrounding the borescope 50 biases the cylinder 61 towards the tip 52 of the borescope. A collar 65 on the cylinder 61 provides and end stop and retains the cylinder in the position shown in the drawing. A suitable lubricant for the interfaces permits the cylinder 61 to slide freely on the cylinder 60 and on the cylindrical barrel of the borescope 50. In practice, light from the light source 12, a high intensity bulb, is conveyed down the fiber optic bundles 14 and 16 and shines through windows 15 and 17 at the tip 52 of the borescope. Reflected light energy reenters the borescope via prism 30 and is focused by the lens assembly 32 onto the receptor surface of the scanning video camera 34.

To measure a gap between two or more panels at the fastener holes, one technician grasps the assembly 10 in his hand, and inserts the tip 52 of the borescope 50 into a fastener hole, permitting the conical end 62 of the cylinder 61 to engage the periphery of the hole. If the assembly is held reasonably perpendicular to the panel surface, the borescope will be automatically centered in the hole. In practice, the skilled technician is able to hold a perpendicular alignment with sufficient accuracy to maintain the required tolerances. Pressing down on the assembly 10 compresses the spring 64 and drives the borescope deeper into the hole.

As described in my prior patent, when the borescope image is centered on the gap, as viewed on the video monitor 36 by a second technician, the image is frozen on the screen and put into temporary memory. The first technician can then withdraw the probe to measure the gaps at another hole, or if there are more than two panel layers, he can drive the probe to the next layer for a second measurement. When the probe is withdrawn, the spring 64 drives the cylinder 61 back to its initial rest position.

Many modifications and variations of this invention will become readily apparent to persons skilled in the art. It is my intention, therefore, that the invention be construed only in accordance with the following claims as read in the light of the prior art.

I claim:

1. A hand held optical probe axially insertable into the fastener holes of a plurality of layers of panels for measuring the gap between adjacent panels, the combination comprising:

a rigid hand held housing, said housing containing a video camera, a source of light, and a fiber optic borescope, the tip of said borescope projecting through said housing, said borescope having optical fibers for directing the light from said source axially toward a fastener hole, the end of the optical fibers extending at a right angle to the axis of the fastener hole so that the edges of the adjacent panels surrounding the hole are illuminated when the probe is at the depth of the gap, and a right angle prism, the light energy reflected from said edges being redirected axially by said prism into said borescope, said video camera scanning said redirected light energy to provide an electronic video image of said gap; and an axially adjustable guide for said probe, said guide comprising a first cylinder fixedly mounted on said housing, a second cylinder having a truncated conical end, said second cylinder being axially slideable on said first cylinder, the tip of said borescope projecting axially through the truncated end of said second cylinder, means biasing said cylinders into an initial position, said conical end of said probe being seatable within said hole, the movement of said probe into said hole driving said cylinders against said bias, and whereby said guide permits said probe to travel variable distances within said fastener hole, while automatically centering the probe within the hole.

2. The invention as defined in claim 1, wherein said biasing means comprises: a stop on the projecting end of said borescope, a coiled spring between said cylinders, said spring biasing said truncated cylinder into an initial position against said stop, the movement of said probe into said hole driving said truncated cone against said spring.

* * * * *